F. BAIN
CAMPING VEHICLE.
APPLICATION FILED NOV. 10, 1919.
1,378,512.
Patented May 17, 1921.
4 SHEETS—SHEET 1.
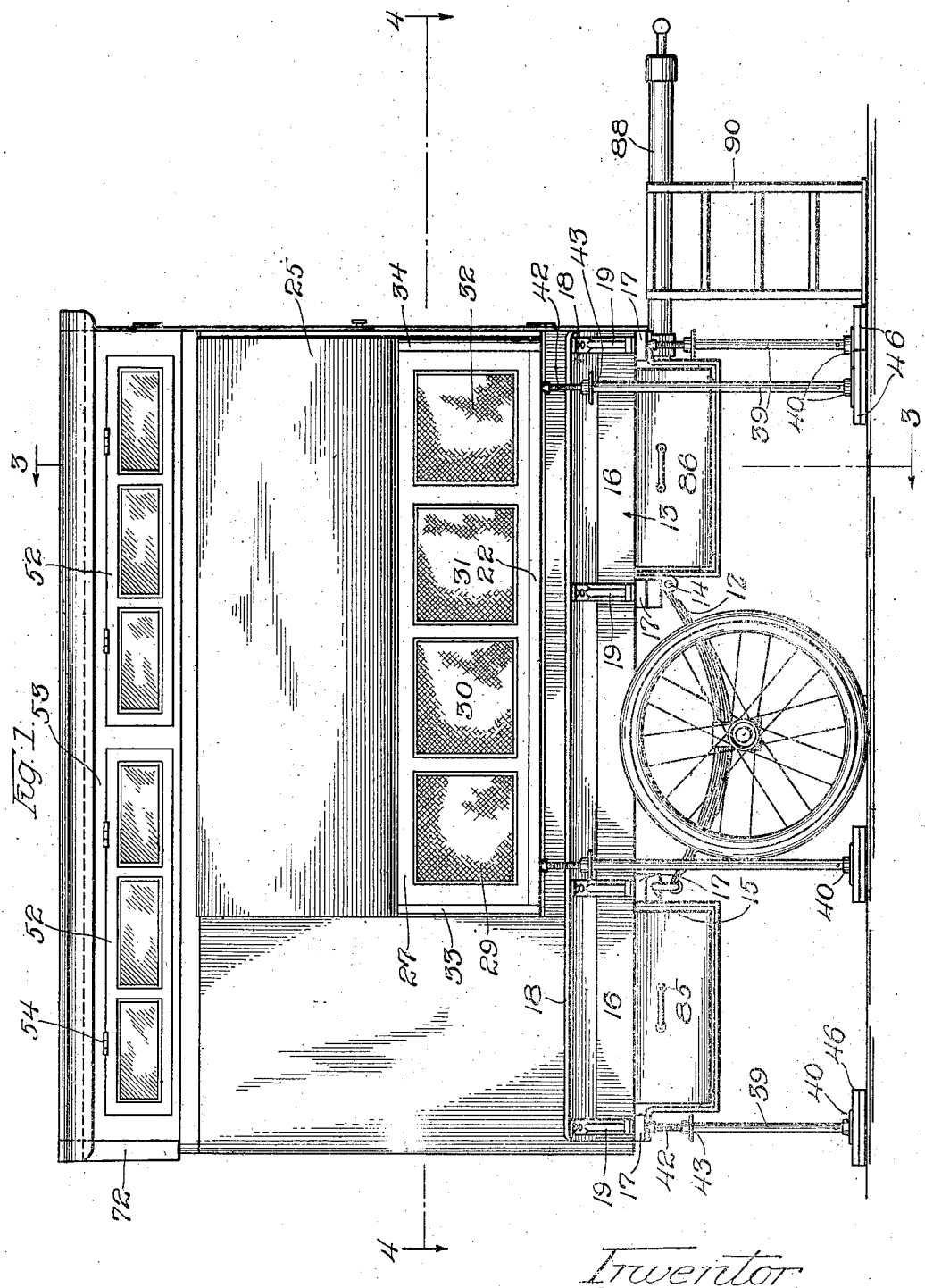
Inventor
Foree Bain

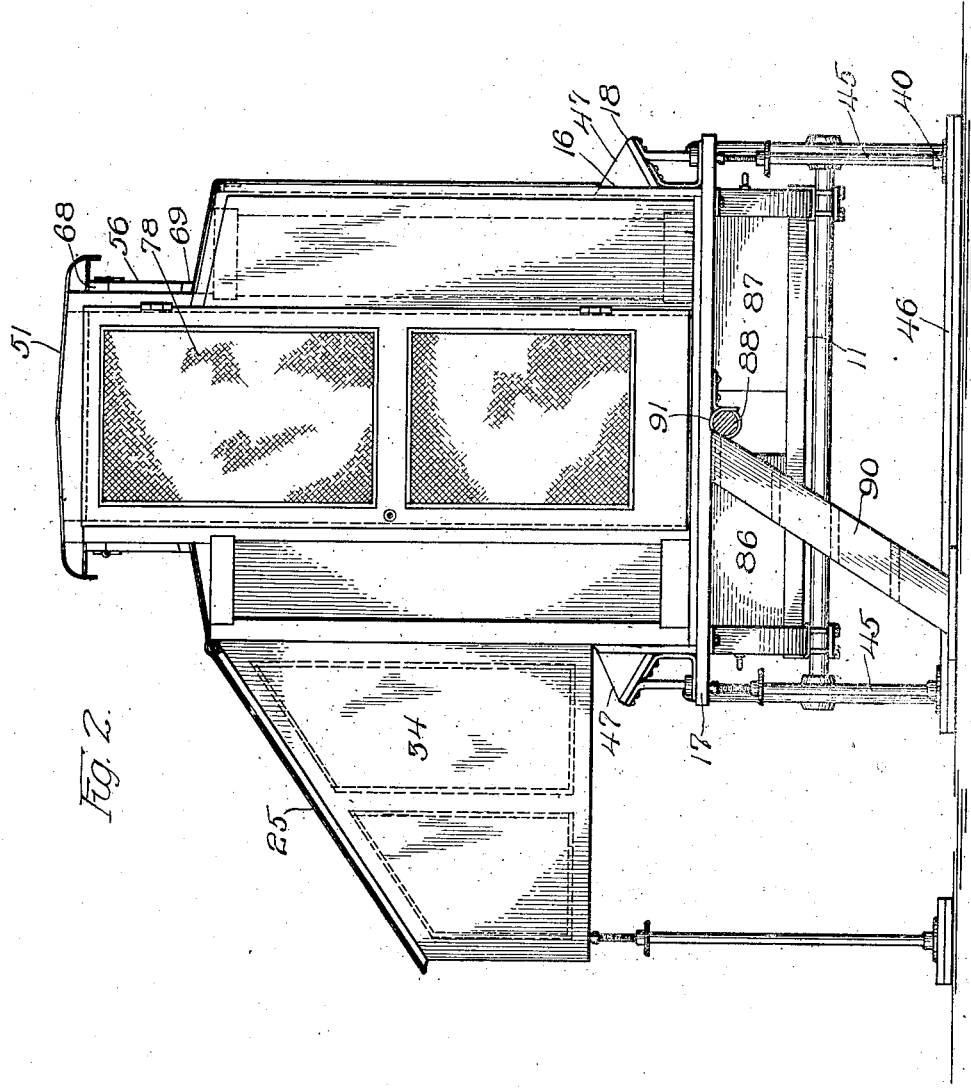

F. BAIN.
CAMPING VEHICLE.
APPLICATION FILED NOV. 10, 1919.
1,378,512.
Patented May 17, 1921.
4 SHEETS—SHEET 3.
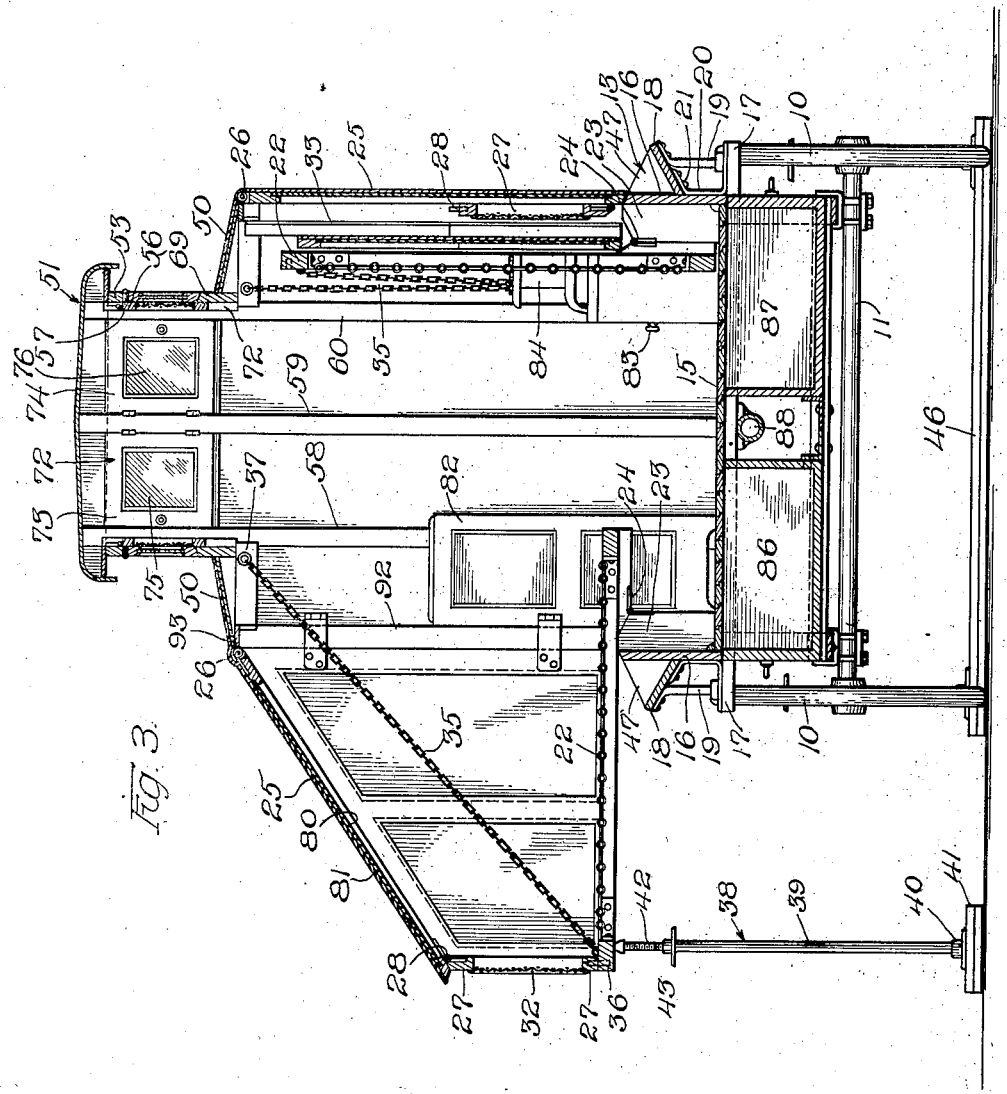
Inventor
Forée Bain

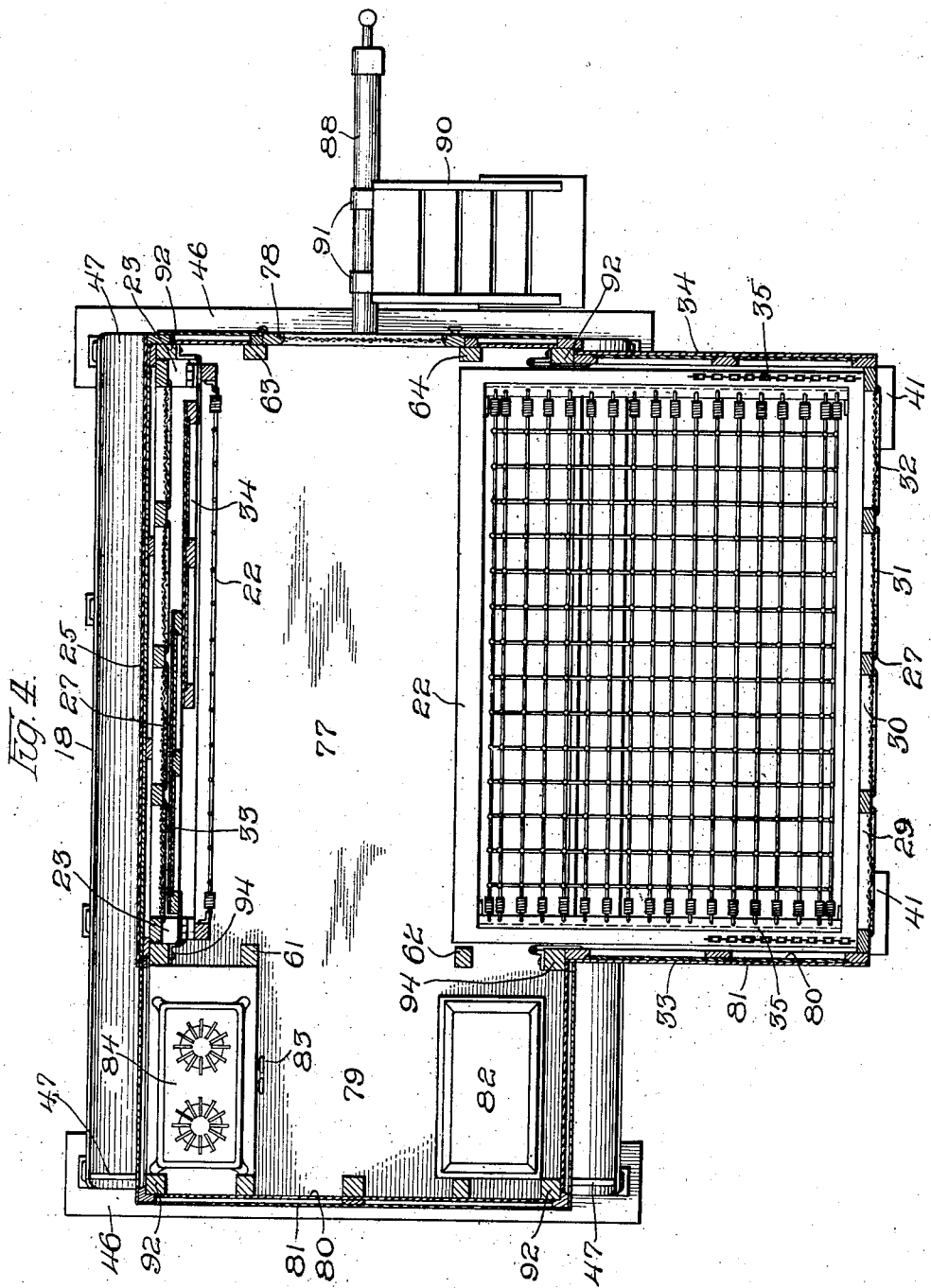

UNITED STATES PATENT OFFICE.

FOREÉ BAIN, OF LA GRANGE, ILLINOIS, ASSIGNOR TO THE MIAMI TRAILER COMPANY, A CORPORATION OF OHIO.

CAMPING-VEHICLE.

1,378,512.　　　　　　Specification of Letters Patent.　　Patented May 17, 1921.

Application filed November 10, 1919. Serial No. 336,937.

*To all whom it may concern:*

Be it known that I, FOREÉ BAIN, a citizen of the United States, residing at La Grange, in the county of Cook and State of Illinois, have invented certain new and useful Improvements in Camping-Vehicles, of which the following is a specification.

The invention relates to improvements in camping vehicles.
One of the objects of the invention is generally to improve vehicles of this character.

Another object is to provide a vehicle in which full size beds may be extended from each of the vehicle sides and subsequently folded up and inclosed in the vehicle body, and in which the side panels of the body are hinged near their top edges to provide a cover or roof for the beds when the latter are extended.
Another object is to provide end doors for the extensible sides that may be folded in between the folded beds and the side panels of the vehicle.

Another object is to provide a vehicle having two opposite folding beds, at one end of the body with a passage way between them and a kitchenette in the other end.

Another object is to provide a screen-covered panel, hinged to the lower edge of each of the side panels, to inclose the beds.

Another object is to provide a central fore and aft deck having transoms and screens located immediately above the passage way, between the beds.
Another object is to provide a screen door, at the end of the vehicle body containing the beds, which extends to the deck from the passage way.

Other, further, and more specific objects of the invention will become readily apparent, to persons skilled in the art, from a consideration of the following description when taken in conjunction with the drawings, wherein:—
Figure 1 is a side elevation of the vehicle showing one bed extended and the side wall of the body, or panel, extended over the bed to provide a roof.

Fig. 2 is a front end view showing one bed extended and inclosed by the side panel and end doors or panels, with the other panels folded in.

Fig. 3 is a transverse section taken on line 3—3 of Fig. 1.

Fig. 4 is a section taken on line 4—4 of Fig. 1.

In all the views the same reference characters are employed to indicate similar parts.

The present exemplification shows the vehicle as a trailer, to be coupled behind an automobile. Without material change, it may be supplied with its own power and a chassis upon which it may be mounted appropriate for self propelled vehicles. The invention is not especially concerned with the chassis or running gear upon which the portable domicile is supported.

The structure is intended to provide home comforts for a camping or traveling party. It is mosquito-proof; thoroughly ventilated, capable of being quickly extended for occupancy and as quickly and conveniently collapsed so as to occupy no more space, when being taken from place to place, than an ordinary spring wagon, the entire body being contained between the ground wheels of the standard gage.

The vehicle is shown, in the present instance, as mounted on two wheels 10, supported on the axle 11. Half elliptic springs 12 are secured to the axle and to the body 13, as at 14, and to a shackle 15. The body 13 is provided with a floor 15, having side or panel boards 16, supported on a series of cross beams or sills 17. Flare boards 18 extend the full length of the panel boards 16 and are located below the upper edge thereof. They are supported by standards 19 that are connected to the cross sills 17, a strap 20 being located under each of the standards 19 and connected to the side boards 16 having a part 21 that supports the flare boards 18.

A spring bed-frame 22 is pivoted to a short vertical post 23 by a hinge 24 at each of its ends. There is such a structure on each side of the vehicle. In Figs. 3 and 4, the bed frame on the left is shown in its extended horizontal position, while a similar frame on the right, is shown swung up into vertical position within the body of the vehicle. The side panel 25 of the body is hinged, as at 26, and may be extended, as shown on the left side of Fig. 3, or it may be placed in a vertical position as shown on the right side, its lower edge making contact with the upper edge of the panel board 16 of the vehicle body. When the side panel 25' is extended, it serves as a roof for the bed 22.

Hinged to the outer lower edge of the panel 25 is a panel 27, as at 28. This panel is divided, preferably, into four sections 29, 30, 31 and 32, and these sections may be covered with screen wire, as shown, to afford ventilation and to prevent entrance of insects into the compartment. When the structure is contracted, as shown on the right hand side, the panel 27 is folded up out of the way, parallel with panel 25, and is held by a button 28. When the parts are extended, the panel 27 is released and occupies a vertical position, its lower edge resting upon the outer rail of the spring bed frame 22. The posts 23 are, about four inches thick and when the bed frames 22 are raised into vertical positions, there is sufficient room between the inner surface of the panel 16 and the vertical bed frame to include the end doors 33 and 34 when the side panel 25 is moved from the position in which it serves as a roof, to its vertical position. The extended parts, including the bed and the surrounding walls, are then within the vehicle body.

Chains 35 are connected to the outer end of the bed frame, as at 36, and to an upper portion of the body structure, as at 37, to temporarily hold the bed frame in horizontal position. A jack 38 is subsequently placed under each of the outer corners of the bed frame to permanently support the bed frame. The jack consists of a pipe 39 screwed into a flange 40, supported upon a wooden block 41, and a screw threaded rod 42 is inserted in the pipe 39. A threaded flange 43 rests upon the upper end of the pipe 39 and is in threaded engagement with the rod so as to vary the effective length of the jack in supporting the bed frame. A similar jack 45, but shorter, is placed under each corner of the body of the vehicle, preferably under the outer ends of the end sills 17. This prevents the vehicle from tilting on its axle. The two front and the two rear jacks, that support the body of the vehicle, are joined together by a board 46 and when the vehicle is in transit the pipes 39 of the jacks, are disconnected from the flange 40 and the jacks and boards are placed in the longitudinally extending opening between the flare board 18 and the panel 16 of the body. The ends between the flare body 18 and the body panel 16 are closed as at 47, so that anything that may be placed within this opening cannot be lost by sliding out at the ends.

Above the immovable roof portion 50 of the body is a deck 51 which extends the full length of the body and its sides are divided into panels, closed by transoms 52, hinged to an upper stringer 53, as at 54, so that they may be moved outwardly. On the inside of the respective panels are a series of wire screen frames 56 hinged at their upper edges to the same stringer, as at 57, but on the inside of the vehicle, so that the screens may be opened in order to open the transoms.

A series of posts 58, 59 and 60 at the rear of the body extend to the top of the deck, while posts 61 and 62, 63 and 64, also extend from the floor to the top of the deck. An upper stringer 53 and a lower stringer 69 connect these posts together and vertically disposed pieces 72 divide the space between the stringers 53 and 69 into panels.

Between the posts 58 and 60 is a cabinet 72, opening on the inside of the vehicle and closed by doors 73 and 74, hinged to the post 59 and containing mirrors 75 and 76. The cabinet 72 is entirely without the vehicle, as shown in Fig. 1. The passage way 77 extends from the screen door 78 at the front of the vehicle body to the rear portion thereof, passing through the kitchenette 79. The kitchenette is surrounded by a double wall composed of rotary cut veneer 80 spaced apart from a water-proof covering of canvas 81. This makes the interior of the vehicle relatively cool in summer and warm in winter. The entire vehicle is covered with wood veneer treated with a wood preservative, and subsequently covered with canvas. The veneer makes for strength and the canvas also protects the veneer from the disastrous effects of the weather.

In the kitchenette 79 is a refrigerator 82 and on the opposite side is a china closet 83, upon which rests an oil stove 84. Extending transversely of and below the rear portion of the vehicle body is a drawer 85 and below the front part of the body are two drawers 86 and 87, one on each side of the coupling bar 88. The drawers are intended to carry extra bedding, cooking utensils, and the like. A ladder 90 having hooks 91 at its upper end to engage the coupling bar 88, affords an easy means of entrance into the vehicle. A post 92 is located in each corner of the body and extends only to the lower portion of the roof 50, as at 93. Another post 94, is located between the posts 92 on either side and to these posts are hinged the end doors 33 and 34, respectively.

While there is herein shown a single embodiment of the invention for the purpose of clear disclosure it will be manifest to persons skilled in the art that considerable change and variation in the configuration and disposition of the parts may be made within the scope of the appended claims.

Having described my invention, what I claim is:

1. A camping vehicle having in combinative association, a body; a bed frame hinged at its ends, one frame near each side and within the body to swing outwardly into horizontal positions and to swing inwardly into vertical positions within said body; side walls of the body hinged at their top edges to swing outwardly to form roofs over the beds; end panels hinged to vertical supports, one at each end of each bed, normally within the body and between the vertically disposed beds and the respective side walls of the body arranged to swing outwardly to close the end openings over the beds and arranged to support the roof thereabove.

2. A camping vehicle having in combinative association a body; a bed frame hinged at its ends near one side of the body to swing outwardly into horizontal position and to swing inwardly into vertical position within the said body; a side panel, the side wall of the body when closed, hinged at its top edge to swing upwardly to provide a roof for the bed frame when the latter is extended and to swing into vertical position to close the body when the bed frame is in vertical position.

3. A camping vehicle having in combinative association a body; a bed frame hinged at its ends near the side of the body to swing outwardly into horizontal position and to swing inwardly into vertical position within said body; a side panel, the side wall of the body when closed, hinged at its upper edge to swing upwardly to provide a roof for the bed frame when the latter is extended and to swing into vertical position to close the body when the frame is in vertical position and two end doors, hinged to swing outwardly, to close the respective openings at the ends of the bed frame when the latter and the said side panel are extended and to swing inwardly into positions between said frame and side panel when the said frame and panel occupy substantially vertical positions.

4. A camping vehicle having in combinative association a body; a bed frame hinged at its ends near one side of the body to swing outwardly into horizontal position and to swing inwardly into vertical position within said body; a side panel, the side wall of the body when closed, hinged at its upper edge to swing upwardly to provide a roof for the bed frame when the latter is extended and to swing into vertical position to close the body when the frame is in vertical position; an extension panel hinged to the bottom edge of the side panel, adapted to swing into vertical position when the panel is extended, and to swing upwardly, parallel with the side panel, when the latter is in vertical position, and two end doors hinged to swing outwardly to close the opening at the ends of the bed frame when the latter and the said side panel are extended and to swing inwardly into positions between said frame and side panel when said frame and panel occupy substantially vertical positions.

5. A camping vehicle having in combinative association a body; a normally vertical bed frame in said body hinged near its bottom edge to swing outwardly into horizontal position therefrom; a side wall hinged near its top to swing outwardly to provide a roof for said bed; side doors, one at each end of the bed, hinged to vertical supports to swing outwardly to support the roof and to close the open spaces at and above the ends of the horizontal bed and a closure hinged to the outer horizontal edge of the roof to swing downwardly to close the open space between the roof and the bed.

6. A camping vehicle having in combinative association a closed body; a bed frame hinged near one side to swing outwardly into horizontal position with a portion of the frame inside the body and a portion outside the body; a side wall of the body hinged at the top to swing outwardly into inclined position to form a roof over said frame; end panels hinged to vertical support of the body near the end of the frame to swing outwardly to close the spaces above the frame and below the roof, and a panel at the outside edge of the frame extending to the outer edge of the roof.

In testimony whereof I hereunto subscribe my name.

FOREÉ BAIN.